(12) United States Patent
Baker et al.

(10) Patent No.: US 6,388,002 B1
(45) Date of Patent: May 14, 2002

(54) DISPERSED RESINS FOR USE IN COATING COMPOSITIONS

(75) Inventors: Gary Baker, Manchester; John William Prince, Rochdale, both of (GB)

(73) Assignee: Rhodia Limited, Hertfordshire (GB)

( * ) Notice: Subject to any disclaimer, the term of this patent is extended or adjusted under 35 U.S.C. 154(b) by 0 days.

(21) Appl. No.: 09/555,741

(22) PCT Filed: Dec. 3, 1998

(86) PCT No.: PCT/GB98/03609

§ 371 Date: Sep. 11, 2000

§ 102(e) Date: Sep. 11, 2000

(87) PCT Pub. No.: WO99/28395

PCT Pub. Date: Jun. 10, 1999

(30) Foreign Application Priority Data

Dec. 4, 1997 (GB) .............................................. 9725778

(51) Int. Cl.⁷ .......................... C08L 77/00; C08K 3/26; C08K 5/04
(52) U.S. Cl. ......................... 524/608; 524/35; 524/271; 524/394; 524/398; 528/336
(58) Field of Search .......................... 524/35, 271, 398, 524/399, 394, 413, 608; 528/336

(56) References Cited

U.S. PATENT DOCUMENTS 3,940,385 A * 2/1976 Smith

FOREIGN PATENT DOCUMENTS

| EP | 0 093 388 A1 | 11/1983 |
| EP | 0 754 560 A1 | 1/1997 |
| FR | 1 284 905 | 7/1962 |

* cited by examiner

Primary Examiner—Tae H. Yoon
(74) Attorney, Agent, or Firm—Finnegan, Henderson, Farabow, Garrett & Dunner, L.L.P.

(57) ABSTRACT

An aqueous composition suitable for coating a substrate is described. The composition comprises a reaction product of (i) at least one carboxylic acid containing from 3 to 22 carbon atoms; and (ii) at least one unsubstituted or substituted aliphatic amine or polyfunctional aromatic amine, containing from 2 to 25 carbon atoms;

(iii) a complex crosslinking agent of a metal from groups Ia, IIa, IIIa or IVa of the first and second rows of the transition metals from the Periodic Table of Elements;

(iv) a resin or oil, the weight ratio of the resin or oil to the sum of (i), (ii) and (iii) being at least 2.5:1; and (v) a thickener, a continuous dry layer obtained by applying the composition to Western Red Cedar providing a contact angle with water not exceeding 80°.

17 Claims, No Drawings

DISPERSED RESINS FOR USE IN COATING COMPOSITIONS

This application is a 371 of PCT/GB98/03609 filed on Dec. 3, 1998.

The present invention relates to dispersed resins used in coating compositions such as paints.

In recent years, apart from emulsion paints, there has been an increase in demand for water-based paints. These paints are prepared by emulsifying the resin or other film forming materials and incorporating pigment, if appropriate, in the emulsified composition. In order to assist the emulsification it is common practice to incorporate a surfactant. However, one of the problems associated with the use of a surfactant is that although it does facilitate the emulsification of the resin it also has a tendency to make the resulting coating more susceptible to water penetration. This is particularly noticeable when the water-based paint is applied over a ferrous metal because in damp conditions rust will form under the coating. The surface activities of the surfactant causes this effect. Thus the very property which makes the surfactant useful in preparing the formulation has an adverse effect on the coating produced from it.

It has now been found, surprisingly, that a particular surfactant system, while being effective in the emulsification of resins and the like, subsequently loses its surfactant effect such that the deleterious effect of ordinary surfactants is not observed or greatly reduced.

An aqueous composition which comprises a reaction product of (i) at least one carboxylic acid containing from 3 to 22 carbon atoms; and (ii) at least one unsubstituted or substituted aliphatic amine or polyfunctional aromatic amine, containing from 2 to 25 carbon atoms;

(iii) a complex crosslinking agent of a metal which is zinc, aluminium, titanium, copper, chromium, iron, zirconium or lead.

(iv) a resin or oil, the weight ratio of the resin or oil to the sum of (i), (ii) and (iii) being at least 2.5:1; and (v) a thickener, a continuous dry layer obtained by applying the composition to Western Red Cedar providing a contact angle with water not exceeding 80°.

The upper limit of the resin or oil (hereafter referred simply as the "resin") is not particularly critical but, in general, the weight ratio will be from 2.5:1 to 100:1 or more. More usually the weight ratio is from 5:1 to 75:1 and, in particular from 10:1 to 60:1. The preferred ratio will depend on the type of coating composition for which the emulsified resin is intended. A particularly preferred range for a primer will be from 2.5:1 or 2.6:1 to 20:1 while for a paint it will be from 30:1 to 50:1.

It will be understood that the emulsified resin formulation can be used as such as a coating composition or the usual ingredients such as pigments can be incorporated.

It will be appreciated that components (i) and (ii) are reacted together. In some instances, in particular where the acid is solid, it is necessary to cause the components to react, typically by melting the solid acid (solid amine is generally readily water-soluble). Subsequently i.e. once the composition has been applied to the substrate, the crosslinking agent will react with this reaction product, thus making the coating more resistant to water penetration.

The time taken for the coating to dry will, of course, depend on various factors such as the water content and atmospheric conditions. Typically, though it will be dry in 24 hours by which time the crosslinking agent will have reacted with the reaction products of (i) and (ii). Substantial crosslinking occurs in a significantly shorter time than this. For example 80% crosslinking can occur in 6 hours.

In order to prevent premature reaction of the crosslinking agents, the composition should be stored in a confined space before use.

Typically, the solids content of the emulsified formulation will vary from 15% to 75% by weight, generally from 25% to 75% by weight and, more particularly, from 35% to 55% by weight. The concentration of the reaction product will generally be from 0.1 to 10%, preferably from 0.5% to 3%, especially 0.5 to 1.5%, by weight.

Typical resins which can be used in the present invention include silicones, alkyd resin, rosin esters, polyurethanes and acrylic polymers. Oils can be used in place of these resins. It will be appreciated that in some formulations it is desirable to use a combination of these in order to obtain particular effects. In particular for primers, it is preferred to use two different types of resin, for example an alkyd resin and a rosin, such that one of the resins penetrates the substrate somewhat, for example the alkyd resin, while the other stays on the surface, for example the rosin, and acts as a "key" for the subsequent paint layer.

The silicone resins used in the present invention will generally have the formula $$M_\alpha D_\beta T_\gamma Q_{67} (OR)_\epsilon \tag{I}$$

where, $M=R^1R^2 R^3SiO_{1/2}$ $D=R^4R^5SiO_{2/2}$ $T=R^6SiO_{3/2}$ 
$Q=SiO_{4/2} R^1, R^2, R^3R^4R^5$ and $R^6$, which can be the same or different, represent a $C_1$–$C_{12}$ especially $C_1$–$C_8$, hydrocarbon radical R: a hydrogen atom or a linear or branched $C_1$–$C_4$ alkyl radical, the copolymer comprising at least one T or Q grouping;

the symbols $\alpha$, $\beta$, $\gamma$, $\delta$ representing, independently, numbers corresponding to the number of atoms of silicon of the type M, D, T and Q relative to an atom of silicon of in the resin of formula (I); the symbol $\epsilon$ representing the molar fraction of the ends $\equiv$SiOR relative to an atom of silicon the resin of formula (I); these symbols having the following limits:

$\alpha$: 0 to 0,5
$\beta$: 0 to 0,95
$\gamma$: 0 to 0,9
$\delta$: 0 to 0,8
$\epsilon$: 0,05 to 2
with a $\alpha+\beta+\gamma+\delta=1$.

The groups M can be the same or different when more than one is present; similar comments apply to the groupings D and T. Likewise the groupings OR can be the same or different.

According to a preferred mode of the present invention, the resin is a copolymer of formula (I) where $R^1$ to $R^6$, which are the same or different, represent a $C_1$–$C_8$ linear or branched alkyl radical, R is a hydrogen atom or a $C_1$–$C_4$ linear or branched alkyl radical the copolymers containing at least one T grouping (the symbol $\gamma$ being a number other than 0) associated with one or more groupings M and D.

Preferred resins are those of formula A and B below:
A: copolymers $M_\alpha D_\beta T_\gamma Q_{67} (OR)_\epsilon$ (II) where
 A1. according to a first definition:
  $R^1$ to $R^6$ $C_1$–$C_8$ identical or different alkyl radicals;
  R: a hydrogen atom or a $C_1$–$C_4$ alkyl radical
  $\alpha$: 0,1 to 0,3
  $\beta$: 0,1 to 0,5

γ: 0,4 to 0,8
ε: 0,08 to 1,5
with α+β+γ=1.
A2. according to a second definition:
  $R^1$ to $R^6$: $C_1$–$C_3$ alkyl radicals
  R: a hydrogen atom or a $C_1$–$C_4$ alkyl radical
  α: 0,1 to 0,3
  β: 0,1 to 0,5
  γ: 0,4 to 0,8
  ε: 0,08 to 1,5
  with α+β+γ=1.
B: The copolymers $D_\beta T_\gamma(OR)$, (III) where
B1. according to the first definition:
  $R^4$ to $R^6$ which may be the same or different represent $C_1$–$C_8$ linear or branched alkyl radical;
  R: a hydrogen atom or a $C_1$–$C_4$ linear or branched alkyl radical, at least 25% of one or more of the substituents $R^4$ to $R^6$ being a $C_3$–$C_8$ linear or branched alkyl radical.
  β: 0,2 to 0,9
  γ: 0,1 to 0,8
  ε: 0,2 to 1,5
B2. According to a more preferred definition:
  $R^4$ and $R^5$: which are the same and represent a $C_1$–$C_2$ alkyl radical,
  $R^6$: a $C_3$–$C_8$ linear or branched alkyl radical;
  R a hydrogen atom or a $C_1$–$C_3$ linear alkyl radical,
  β: 0,2 to 0,6
  γ: 0,4 to 0,8
  ε: 0,3 to 1,0

In general each of radicals $R^1$ to $R^6$ can be a linear or branched alkyl radical, for example methyl, ethyl, propyl, butyl or isobutyl; an alkenyl radical such as vinyl; an aryl radical such as phenyl or naphthyl; an arylalkyl radical such as benzyl or phenylethyl; an alkylaryl radical such as tolyl or xylyl; or an araryl radical such as biphenyl.

Typical alkyd resins can be used in the present invention include both drying and non-drying alkyd resins. Thus suitable alkyd resins include oil type using oils having a long carbon chain, eg. $C_{16}$–$C_{22}$, especially $C_{18}$, and typically one or two unsaturated double bonds such as linseed oil, soya oil or safflower oil, which are preferred along with blown rapeseed oil, castor oil, coconut oil and cottonseed oil and alcohol type alkyd resins, using alcohols such as pentaerythritol and glycerol or a mixture of alcohols, together with modified alkyd resins such as with a urethane, phthalic anhydride, isophthalic acid or a hydroxylated polyester or an oil free alkyd.

Other resins which may be used in the present invention include rosin esters, which are preferred, polyurethanes, acrylic polymers, epoxy resins, urea/formaldehyde resins and melamine resins. Typical examples of suitable rosin esters which can be used include those derived from triethylene glycol, which is preferred, glycerol esters, pentaerythritol esters, and diethylene glycol esters along with liquid rosins and esters of modified or polymerised rosins.

Suitable oils which can be used include fatty oils and drying oils such as linseed oil, rape seed oil, fish oil, sunflower oil, and safflower oil, which are preferred, as well as corn oil, soya oil, tung oil and dehydrated oils such as castor oil, hydrocarbon/mineral oils such as paraffin oil, white oil and process oils, and essential oils such as lavender oil, which is preferred, as well as rose oil and pine oil. Silicone oil may also be used.

In the compositions used in the present invention, the complex crosslinking agent will contain one or more metals Naturally, the metal should be chosen so that it does not react with the resin employed. The crosslinking agents contain zinc, aluminium, titanium, copper, chromium, iron, zirconium and/or lead.

The crosslinking agent may be a salt or complex of the metal(s). The salts may be acid, basic or neutral. Suitable salts include halides, hydroxides, carbonates, nitrates, nitrites, sulphates, phosphates etc.

The preferred crosslinking agents are zirconium complexes, for example those described in GB-1002103, which are salts of the zirconyl radical with at least two monocarboxylic acids, one acid group having from 1 to 4 carbon atoms, the other having more than 4 carbon atoms, which may be made by refluxing the carboxylic acid of 1 to 4 carbon atoms with a zirconyl carbonate paste and then adding the carboxylic acid having more than 4 carbon atoms. Water-soluble inorganic metal compounds may also be used. Ammonium zirconium carbonate is particularly preferred.

Typically the metal complexing agent is used in roughly stoichiometric amounts relative to the amine/acid reaction product. Generally the amount of metal complexing agent should not exceed the stoichiometric amount as increasing the amount tends to decrease the stability of the coating composition. In general the mole ratio of metal to reaction product is from 1:1 to 0.1, generally 0.75 to 0.2, and preferably 0.6 to 0.4. If the amount is reduced too much the coating composition does not produce enough water resistance.

The carboxylic acid is an optionally substituted, e.g. by hydroxy, straight or branched chain, saturated or unsaturated $C_3$–$C_{22}$, preferably $C_{10}$–$C_{18}$, fatty acid, e.g. oleic, isostearic, stearic, ricinoleic or tall oil fatty acid.

The unsubstituted or substituted aliphatic amine or polyfunctional aromatic amine is preferably water-soluble in order that a water-dispersible compound is produced when it is reacted with the carboxylic acid. It may be a primary, secondary or tertiary amine optionally substituted, e.g. by one or more hydroxyls, or in the form of an amide, e.g. an amide of the formula

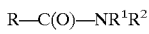

$$R\text{—}C(O)\text{—}NR^1R^2$$

where R, $R^1$ and $R^2$ each represent hydrogen, or an optionally substituted alkyl group of 1 to 5 carbon atoms. Suitable substituents for the above optionally substituted groups include halogen, hydroxy or an alkyl group preferably with from 1 to 5 carbon atoms.

Examples of suitable amines and substituted amines include: ethylamine, 2-amino-2-methyl-propan-1-ol, diethylamine, triethylamine, 2-amino-2-ethyl-propane-1,3-diol, 3-amino-1,2-propane-diol, formamide, acetamide, N-ethyl-acetamide, N,N-dimethyl-butyramide, hydrazine, hexamethylene-diamine and tris-hydroxy-methyl-amino methane.

As one of skill in the art will appreciate, the particular combination of acid and amine should be selected depending on the resin to be used and the solids content desired. The nature of the acid determines whether the reaction product is solid or liquid. A solid reaction product has limited solubility so that less can be used but is useful for resins which are difficult to emulsify, for example rosin. In contrast reaction products of liquid acids and solid amines can be used for high solids contents, for example for alkyd resins.

The thickener is an essential ingredient of the composition in order to increase its viscosity and thus the brushability of the coating composition and also reduce penetration of the composition below the surface of the substrate to be treated. The thickener is generally present in an amount of at least 0.1% by weight. Typically the thickener will be present in an amount from 0.1 to 5%, especially from 0.3 to 4%, although for primers the concentration will generally not exceed 1% by weight. Suitable thickeners include polyurethanes, especially non-ionic water-soluble polyurethanes, celluloses, such as hydroxy ethyl cellulose, and xanthan gum, acrylic thickeners e.g. alkali soluble polyacrylate emulsions and chelate thickeners such as ammoniacal zirconium compounds, which are preferably present in an amount from 0.3 to 2% by weight, and clay, preferably present in an amount from 1 to 4% by weight.

It will be appreciated that the compositions of the present invention are intended principally as primers and undercoats. Accordingly, the resulting coating must be appropriate to receive a top coat. For this purpose the surface must not, of course, be water repellent. Thus the contact angle between the substrate and water should not exceed 80° The contact angle generally should not exceed 600 and preferably not more than 50°. Thus typically, the contact angle is 60° to 30°, especially 55° to 35°.

The contact angle can be determined by first applying a continuous layer of the composition to a wood sample. For this purpose Western Red Cedar, of good condition, which had been planed can be employed as the substrate. This is then coated with the composition to provide a good continuous layer. This is generally best achieved by applying two coats of the composition. Obviously the maximum amount which can be applied will vary with the formation but it is sufficient that the wood is well covered by it. The coat or coats should be allowed to dry before the contact angle is measured. The contact angle can be determined using, for example, a Kruss contact angle meter G1, having applied to the surface a droplet of water which had been distilled once. Measurements should be taken once equilibrium has been reached. This will vary with the wood sample. In many instances, equilibrium is reached with 3 to 5 minutes but, in some cases, a longer time, for example about 30 minutes, is required. In order to allow for variations in the wood surface, it is desirable to take 5 measurements and calculate the mean value.

Other ingredients which can be present either in the emulsified resin or oil formulations or in the resultant coating composition include pigment and dyes, typically in an amount from 3% to 30% by weight, anti-corrosive agents such as zinc phosphate, typically in an amount from 2% to 5% by weight, extenders such as calcium carbonate, silica, barytes and talc, typically in an amount from 1% to 30% by weight, bentonite in an amount up to about 1% by weight, biocides in an amount up to 1% by weight, wetting agents such as phosphate esters in an amount up to 0.5% by weight, coalescing agents such as butyldiglycol, typically in an amount up to about 5% by weight, antifoam agents, typically in an amount up to 0.5% by weight, anti oxidants, typically in an amount up to 0.5% by weight, and adhesion promoters such as an acrylic latex, typically in an amount from 1 to 10% by weight and waxes including petroleum waxes such as paraffin wax (refined, partially refined or unrefined), microcrystalline wax and slack wax, vegetable waxes such as montan wax, carnauba wax and candellila wax, animal wax such as beeswax or shellac wax, hydrocarbon mineral wax such as ceresin, synthetic wax such as polyethylene wax and mixtures of waxes, for example paraffinic and microcrystalline wax mixtures. For masonry paints and the like, small grits and fillers customarily used in such paints can be incorporated, for example china clay, titanium dioxide and silicas. Depending on the nature of the resin, it may be desirable to include crosslinking agents such as melamine resins for non-drying alkyd resins along with drying agents based on metals such as cobalt, zirconium, zinc, calcium, lithium, manganese, aluminium and lead, for example cobalt or zirconium octoate.

The balance of the composition is, of course, water.

In order to prepare the emulsified resin compositions of the present invention, typically, the amine and acid are heated in water to, say, 75° C. to 80° C. and then homogenised. The resin is then added along with the thickener and any additives and the mixture is allowed to cool before the metal complex is added. For conversion into a coating composition pigments and the like are added and the mixture homogenised.

The following Examples further illustrate the present invention.

EXAMPLE 1

An alkyd emulsion was prepared from the following ingredients:

|  | gms |
| --- | --- |
| AEPD (2-amino-2-methyl-propan-1-ol) | 0.60 |
| Stearic Acid | 1.40 |
| Fish Oil alkyd | 40.00 |
| Ammonium Zirconium Carbonate (AZC) | 6.10 |
| 10% Cobalt Octoate | 0.20 |
| 18% Zirconium Octoate | 0.02 |
| Meko (antioxidant) | 0.40 |
| Water 1 | 0.90 |
| Coatex BR125 (polyurethane thickener) | 0.10 |
| Water 2 | 149.18 |
| AF1907 (anti foam) | 0.10 |
| 0.88 Ammonia | 1.00 |
|  | 200.00 |

The formulation was prepared in the following manner:
1. Charge AEPD, stearic acid and water 2. Heat to 75°–80° C.
2. Homogenise @ 6000 RPM.
3. Add alkyd.
4. Add driers mixed with Meko.
5. Cool with homogenisation to 300°–35° C., stop homogenising.
6. Add AZC and 0.88 ammonia and mix.
7. Add coatex and water 1 pre mix.
8. Stir well.
9. Bottle.

The effectiveness of the resulting alkyd emulsion in preventing absorption of water was measured against a control by painting the composition onto white pine. The results obtained are as follows:

TOP COAT ALKYD RESINS

WHITE PINE

| Sample | % Water Absorbed | % Reduction | % Swell | % Reduction |
| --- | --- | --- | --- | --- |
| Control | 51.14 | — | 3.65 | — |
| 25% Alkyd Emulsion | 5.20 | 89.88 | 0.44 | 87.95 |

EXAMPLE 2

The following formulation was prepared from parts A and B below:

|  | gms |
|---|---|
| Part A | |
| THMAM (trishydroxymethyl)amino methane) | 3.0 |
| Tall Oil Fatty Acid | 7.0 |
| A 90 Alkyd | 25.0 |
| AD Yellow 42 | 10.0 |
| RHODOPOL 23 (Xanthan gum thickener) } premix | 1.0 |
| Water 1 | 100.0 |
| Ammonium Zirconium Carbonate | 29.4 |
| Water 2 | 324.6 |
| AF1907 | 0.04 |
|  | 500.00 |
| Part B | |
| AEPD | 0.75 |
| Stearic Acid | 1.75 |
| Bevitack 210 (rosin ester) | 12.50 |
| AD Yellow 42 | 5.00 |
| RHODOPOL 23 } premix | 0.50 |
| Water 1 | 50.00 |
| Ammonium Zirconium Carbonate | 14.70 |
| Water 2 | 164.80 |
| AF 1907 | 0.02 |
|  | 250.02 |

450 grams of Part A was mixed with 56.25 grams of Part B and 56.25 grams of DS1029, an acrylic latex to assist adhesion using the following procedure:

Part A:
1. Charge water 2, tris(hydroxymethyl)amino methane, tall oil fatty acid and A 90 alkyd.
2. Heat to 40° C. and homogenise at 6000 RPM.
3. After 5 minutes homogenisation cool to <30° C.
4. Add RHODOPOL 23 and water 1 premix.
5. Add pigment.
6. Add AF1907.
7. Add ammonium zirconium carbonate.

Part B:
1. Charge water 2, AEPD, stearic acid and Bevitack 210.
2. Heat to 70–75° C. and homogenise at 6000 RPM.
3. After 5 minutes homogenisation cool to <30° C.
4. Add RHODOPOL and water 1 premix.
5. Add pigment.
6. Add AF1907.
7. Add ammonium zirconium carbonate.

The water absorption of the resulting formulation was assessed against a control, a solvent based commercial product, and an aqueous based alkyd resin formulation. The aqueous based formulation had a solid content of 30% whereas the formulation of this example had a solid content of only 15%. The results obtained are given in the following table:

The contact angle of the composition was determined using once-distilled water and Western Red Cedar; the amount coated was 52 mls per square metre.

ALKYD PRIMER

| Sample | Water Absorbed % | % Reduction | Swell % | % Reduction | Adhesion % |
|---|---|---|---|---|---|
| Control | 46.4 | — | 3.17 | — | — |
| Solvent Based Competitor (VISIR NATURAL of Akzo-Nobel) | 6.5 | 86 | 0.32 | 90 | 100 |
| Manalox WB10 | 7.0 | 85 | 0.48 | 85 | 60 |
| Aqueous Based Competitor (VISIR AQUA of Azko-Nobel) | 27.4 | 41 | 2.07 | 35 | 100 |
| Example 2 | 12.7 | 73 | 0.98 | 69 | 100 |

EXAMPLE 3

The following formulation was prepared:

|  | gms |
|---|---|
| AEPD | 1.20 |
| Stearic Acid | 2.80 |
| Drying oil | 120.00 |
| Zinc Neodecanoate | 0.38 |
| 10% Cobalt Octoate | 0.60 |
| 18% Zirconium Octoate | 0.60 |
| Meko | 0.60 |
| Water | 261.50 |
| AZC | 12.30 |
|  | 400.00 |

The formulation was obtained by the following procedure:

1. Heat AEPD and stearate in water to 80° C.–85° C.
2. Homogenise at 6000 RPM.
3. Add drying oil, driers, Meko and mix.
4. Homogenise at 6000 RPM for 10 minutes.
5. Reduce homogeniser speed to minimum and cool to <35° C.
6. Add AZC.

Water absorption and swell of pine coated with this composition in relation to a control. Whereas for the control the % swell was 2.36 and the % water absorbed was 49.5, for the product of the present invention the values were only 0.26 and 3.10, respectively.

The results of swelling tests gave values for a control of 2.7% and 4.3i after 30 minutes and 120 minutes, respectively. For the formulation of this Example the corresponding value were only 0.25% and 0.9%.

EXAMPLE 4

The following formulation was used:

|  | gms |
|---|---|
| AEPD | 1.5 |
| Stearic Acid | 3.5 |
| A90 Alkyd | 200.0 |
| AZC | 15.4 |
| Water | 279.6 |
|  | 500 |

This formulation was obtained by the following method:
1. Heat AEPD and stearate in water to 80° C.
2. Homogenise @ 6000 RPM.
3. Add alkyd A90 as fast as possible.
4. Homogenise @ 6000 RPM for 2 minutes.
5. Reduce homogeniser for minium speed and cool to <35° C.
6. Add AZC, mix gently and discharge to bottle.

Water absorption and swell of pine coated with this composition was measured in relation to a control. Whereas for the control the % swell was 2.36 and the % water absorbed was 49.5, for the product of the present invention the values were only 0.26 and 3.10, respectively.

EXAMPLE 5

Swell tests were conducted on white pine using a polymerised linseed oil alkyd resin (50%). Tests were conducted on a simple mixture of solvent and alkyd and on a water based emulsion containing the amine and acid, with and without AZC. This formulation was as follows:

| COMPONENT | PARTS BY WT |
|---|---|
| AEPD | 3.62 |
| STEARIC ACID | 8.38 |
| ALKYD | 500.00 |
| AZC | 23.17 |
| WATER | 464.83 |
|  | 1000.00 |

The following results were obtained:

|  |  | SWELL (%) | H$_2$O ABSORPTION % |
|---|---|---|---|
| ROB 30P | Solvent | 3.12 | 30.12 |
|  | Water - No AZC | 2.59 | 18.56 |
|  | Water - With AZC | 1.25 | 9.74 |
| Blank | Solvent | 4.71 | 45.59 |
|  | Water | 3.74 | 54.46 |

The "Blank" is untreated wood.
The effect of AZC can clearly be seen.

EXAMPLE 6

The formulation of the present invention used in the preceding example was tested for its stability by varying the loadings of Zr. The results obtained are shown in the following Table:

| | Stability | | | | | |
|---|---|---|---|---|---|---|
| | 10 Days @ Room Temp. | | | 10 Days @ 40° C. * | | |
| Molar Ratio ZR:Soap | AQ Split° (%) | Alkyd (%) | Redispersion | AQ Split (%) | Alkyd (%) | Redispersion |
| 1.00:1.00 | 20 | 0 | Poor | 20 | 5 | Poor |
| 0.75:1.00 | 20 | 0 | Fair | 20 | 5 (Raggy) | Fair |
| 0.50:1.00 | 20 | 5 (Raggy) | Good | 10 | 5 (Raggy) | Good |
| 0.25:1.00 | 25 | 0 | Good | 0 | 5 (Raggy) | Good |
| 0:1.00 | 17 | 5 | Poor | 33 | 2 (Raggy) | Poor |

* Accelerated ageing.
° % of definable aqueous phase.
Raggy = ill defined boundary layer.
Soap = amine/acid reaction product.

These results show that stability increases when the amount of Zr is reduced below the stoichiometric amount.

Tests were also conducted to investigate the effect of changing the Zr:soap ratio on swell (of white pine) and water absorption. The results obtained were as follows:

| M Zr:M Soap | Swell (%) | H$_2$O ABS (%) |
|---|---|---|
| 1.0:1.0 | 0.68 | 6.53 |
| 0.8:1.0 | 0.82 | 7.74 |
| 0.6:1.0 | 0.78 | 7.86 |
| BLANK | 2.54 | 41.80 |

These show that the concentration of Zr can be reduced without much loss in performance.

What is claimed is:

1. An aqueous composition which comprises a reaction product of:
   (i) at least one carboxylic acid containing from 3 to 22 carbon atoms: and
   (ii) at least one aliphatic amine or polyfunctional aromatic amine, containing from 2 to 25 carbon atoms, which is unsubstituted or substituted by halogen, hydroxy or alkyl, or an amide of the formula: R—C(O)—NR$^1$R$^2$, where R, R$^1$, and R$^2$ each independently represent hydrogen or an alkyl group of 1 to 5 carbon atoms optionally substituted by halogen, hydroxy or alkyl; and, as separate components,
   (iii) a complex crosslinking agent comprising zirconium;
   (iv) a resin or oil, wherein the weight ratio of the resin or oil to the sum of (i), (ii), and (iii) is at least 2.5:1; and
   (v) a thickener,
   wherein said composition, when applied to wood, results in a continuous dry layer providing a contact angle with water not exceeding 80°.

2. The composition according to claim 1 wherein the weight ratio of resin or oil to the sum of (i), (ii), and (iii) is from 10:1 to 60:1.

3. The composition according to claim 2 in which the said weight ratio is from 30:1 to 50:1.

4. The composition according to claim 1 which is in the form of a primer and wherein the said weight ratio is from 2.5:1 to 20:1.

5. The composition according to claim 1 in which the said contact angle does not exceed 60°.

6. The composition according to claim 5 in which the said contact angle is from 35° to 55°.

7. The composition according to claim 1 having a solids content from 25% to 75% by weight.

8. The composition according to claim 1 in which the resin is selected from a silicone, an alkyd resin, a rosin ester, a polyurethane, and a acrylic polymer.

9. The composition according to claim 1 which comprises at least two different resins.

10. The composition according to claim 9 wherein the resins are an alkyd resin and a rosin ester.

11. The composition according to claim 1 in which the oil is selected from a fatty oil, a drying oil, a dehydrated oil, a hydrocarbon/mineral oil, and an essential oil.

12. The composition according to claim 1 in which the thickener is present in an amount from 0.3 to 4% by weight.

13. The composition according to claim 1 in which the thickener is selected from a polyurethane, cellulose, xanthan gum, an acrylic thickener, and a chelate thickener.

14. The composition according to claim 1 which further comprises a pigment.

15. A process for preparing a composition as claimed in claim 1, comprising mixing the amine and acid in water, optionally with heating, adding the resin and thickener, and adding the complex crosslinking agent after allowing the mixture to cool.

16. The process according to claim 15 in which the acid is solid and is melted before being added to the water.

17. A method of preparing an aqueous coating composition, comprising reacting components (i) and (ii), and adding components (iii), (iv) and (v), as defined in claim 1, wherein if said composition is applied to wood, and allowed to dry, said composition results in a continuous dry layer providing a contact angle ith water not exceeding 80°.

* * * * *

UNITED STATES PATENT AND TRADEMARK OFFICE
CERTIFICATE OF CORRECTION

PATENT NO. : 6,388,002 B1
DATED : May 14, 2002
INVENTOR(S) : Gary Baker et al.

It is certified that error appears in the above-identified patent and that said Letters Patent is hereby corrected as shown below:

Column 12,
Line 15, "ith" should read -- with --.

Signed and Sealed this

Twenty-seventh Day of August, 2002

Attest:

JAMES E. ROGAN
Attesting Officer  Director of the United States Patent and Trademark Office